United States Patent [19]
Dent et al.

[11] Patent Number: 5,335,946
[45] Date of Patent: Aug. 9, 1994

[54] COOPERATING COMBINATION OF A GLAND AND A GRIP RING INSTALLED IN RESTRAINED SEALED BOLTED JOINTS OF FLUID PIPING SYSTEMS INCLUDING BOTH PLASTIC PIPE AND METALLIC PIPE

[75] Inventors: Larry G. Dent, Castle Rock; George F. Denison, Seattle, both of Wash.

[73] Assignee: Romac Industries Inc., Seattle, Wash.

[21] Appl. No.: 920,769

[22] Filed: Jul. 28, 1992

[51] Int. Cl.$^5$ ............................................. F16L 17/00
[52] U.S. Cl. .................................. 285/243; 285/322; 285/332; 285/342; 285/356
[58] Field of Search ............... 285/322, 323, 332, 337, 285/342, 343, 348, 368, 241, 242, 243, 328, 258, 356, 393

[56] References Cited

U.S. PATENT DOCUMENTS

| | | | |
|---|---|---|---|
| 2,779,610 | 1/1957 | Risley | 285/343 X |
| 2,842,383 | 7/1958 | Merrill . | |
| 3,204,988 | 9/1965 | Ouderkirk et al. | 285/40 |
| 3,594,024 | 7/1971 | Yano | 285/337 |
| 3,600,010 | 8/1971 | Downs, III | 285/96 |
| 3,815,940 | 6/1974 | Luckenbill | 285/105 |
| 4,070,046 | 1/1978 | Felker et al. | 285/337 |
| 4,092,036 | 5/1978 | Sato et al. | 285/337 |
| 4,119,335 | 10/1978 | Rieffle et al. | 285/337 |
| 4,282,175 | 8/1981 | Volgstadt | 285/104 X |
| 4,417,754 | 11/1983 | Yamaji et al. | 285/104 |
| 4,466,640 | 8/1984 | Van Houtte | 285/104 |
| 4,538,841 | 9/1985 | Royston | 285/337 |
| 4,544,188 | 10/1985 | Dugger | 285/337 |
| 4,569,542 | 2/1986 | Anderson et al. | 285/348 X |
| 4,606,565 | 8/1986 | Royston | 285/337 |
| 4,664,426 | 5/1987 | Ueki | 285/337 |
| 4,721,330 | 1/1988 | Woodhouse | 285/177 |
| 4,867,488 | 9/1989 | Jones | 285/328 |
| 4,874,192 | 10/1989 | Key | 285/337 |
| 4,878,697 | 11/1989 | Henry | 285/322 X |
| 4,878,698 | 11/1989 | Gilchrist | 285/342 |
| 4,936,609 | 6/1990 | Metcalfe | 285/286 |
| 5,069,490 | 12/1991 | Halen, Jr. | 285/348 X |
| 5,100,183 | 3/1992 | Montesi et al. | 285/348 X |

FOREIGN PATENT DOCUMENTS

| | | |
|---|---|---|
| 287796 | 1/1965 | Australia . |
| 687807 | 6/1964 | Canada .................................. 285/104 |
| 1580069 | 10/1969 | France . |
| 134226 | 11/1978 | Japan . |
| 344879 | 4/1960 | Switzerland . |
| 970887 | 9/1964 | United Kingdom . |
| 1319596 | 6/1973 | United Kingdom . |

OTHER PUBLICATIONS

EBAA Iron Sales Inc's Brochure-Re: "Meg A Lug'-'-Listed in this Brochure U.S. Pat. Nos. 4,779,900; 4,896,903.
Midland Mfg. Co. Brochure-Re:"Midco's" Perma--Grip Restrained Joint System.

*Primary Examiner*—Randolph A. Reese
*Assistant Examiner*—Heather Chun
*Attorney, Agent, or Firm*—Roy E. Mattern, Jr.

[57] ABSTRACT

A cooperating combination of a metallic gland and a metallic grip ring is for both plastic pipe and metallic pipe used in fluid piping systems, where these pipes are part of assembled restrained sealed bolted joints. The grip ring, in addition to two well spaced major sized teeth, has several spaced minor sized pipe gripping circumferential teeth located between and beyond the major sized teeth. The major sized teeth extend radially inwardly farther than the minor sized teeth within the grip ring. When the installed grip ring is restraining a metallic pipe, only the major size teeth are, in part, penetrating the metallic pipe. When this installed grip ring is restraining a plastic pipe both the major size teeth and the minor size teeth are penetrating the plastic pipe. The major size teeth take a lot of concentrated force, which is created when the fasteners of the bolted joint are tightened. The minor size teeth, which are closer together, are needed to provide more tooth contact area to spread out the restraining forces needed to hold the relatively weaker plastic pipes of comparable outside diameters within their respective restrained sealed bolted joints.

9 Claims, 3 Drawing Sheets

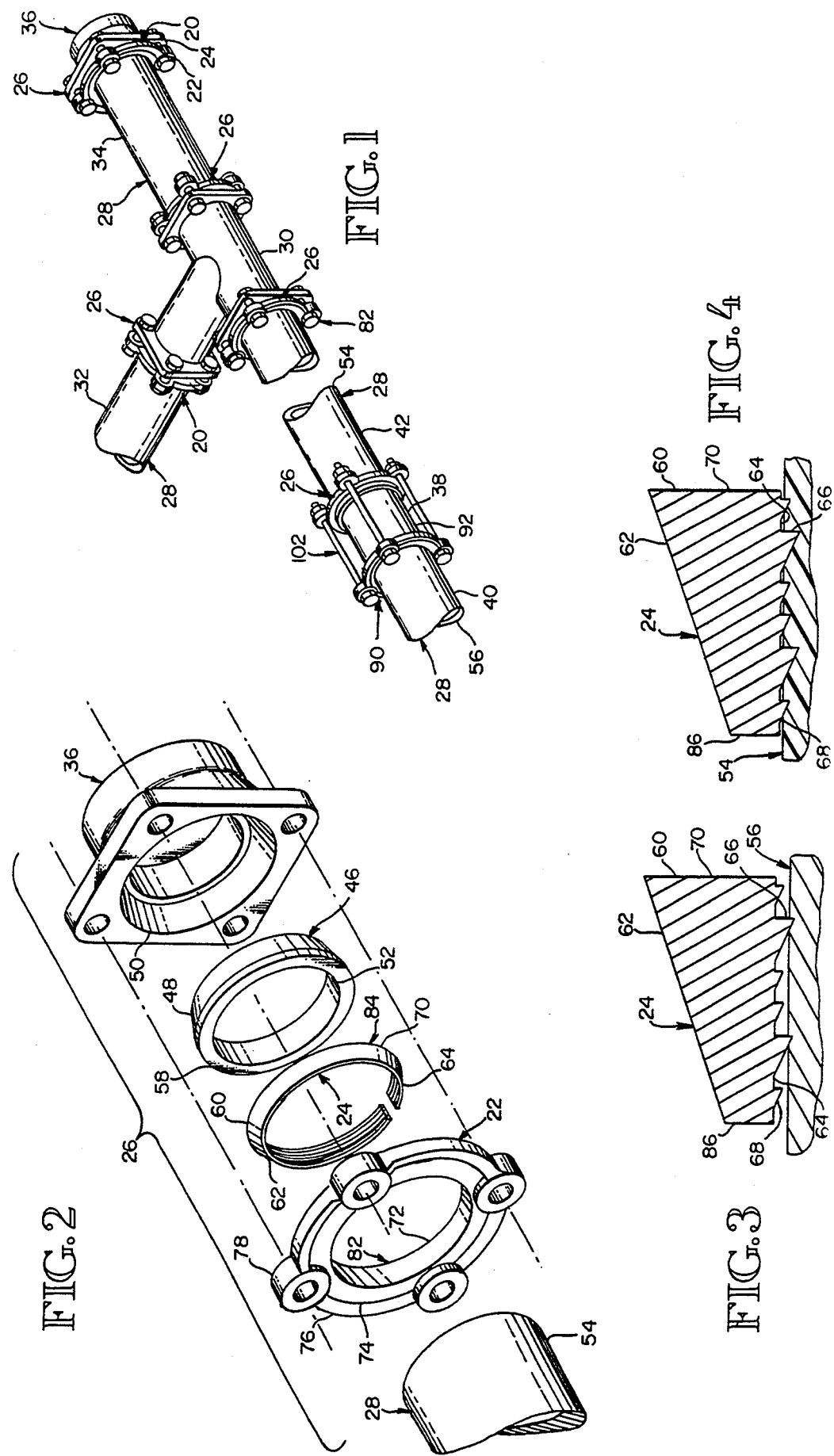

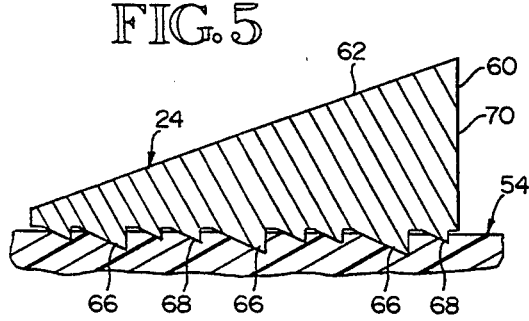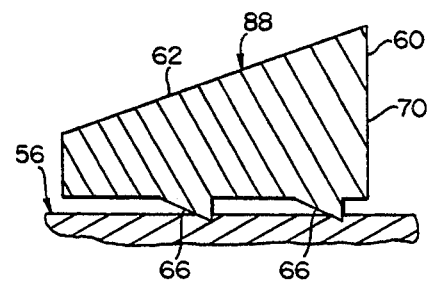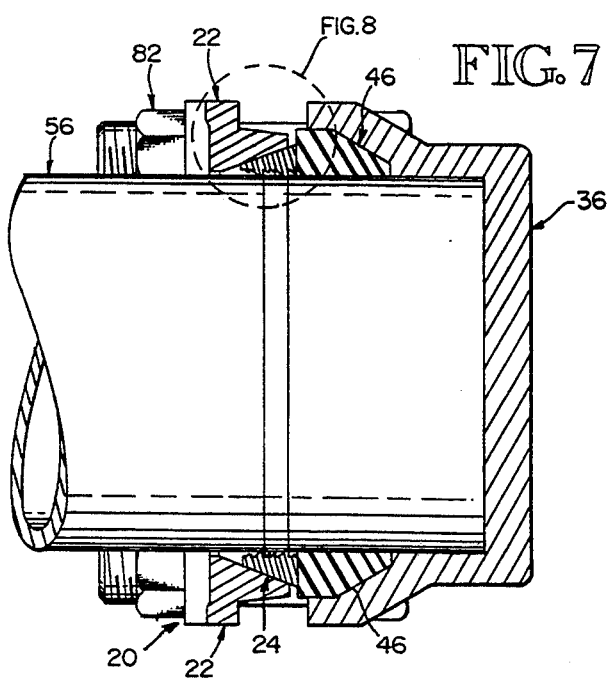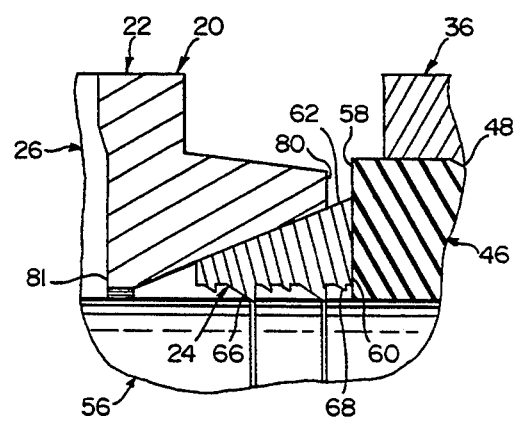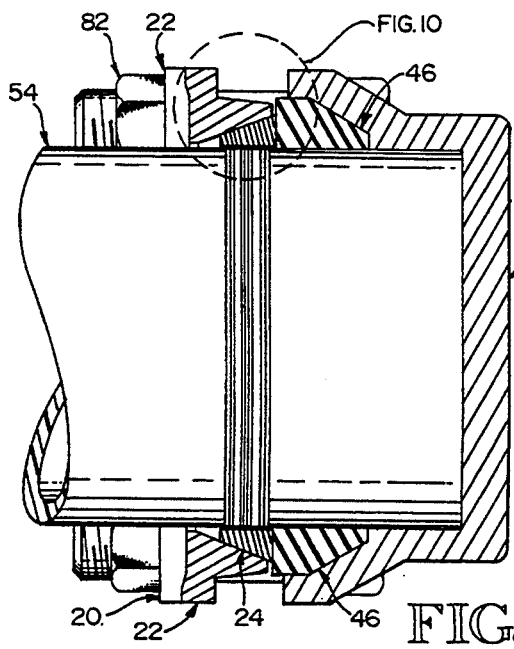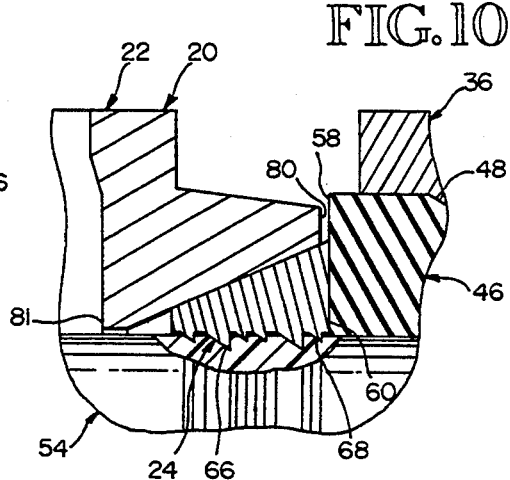

COOPERATING COMBINATION OF A GLAND AND A GRIP RING INSTALLED IN RESTRAINED SEALED BOLTED JOINTS OF FLUID PIPING SYSTEMS INCLUDING BOTH PLASTIC PIPE AND METALLIC PIPE

BACKGROUND

In restraining sealed bolted pipe joints of fluid piping systems, a metallic gland and a metallic gripping ring have been used and are being used together to position, to compress, and to seal a gasket about both plastic and metallic pipe. In respect to trying to create excellent seals about both plastic and metallic pipes, when using these metallic gripping rings, difficulties are often encountered. Because there is a limited amount of engaging force created upon the tightening of the bolt and nut fasteners, the gripping ring must have structure that will sufficiently penetrate metallic pipe in creating adequate restraining forces. In contrast, in gripping plastic pipe, which is comparatively weaker, the adequate restraining forces must be spread out through lots of tooth contact area.

In U.S. Pat. No. 4,878,698 of 1989, R. Fowler Gilchrist illustrates and describes his metallic gland and metallic gripping ring used in restraining sealed bolted pipe joints of fluid piping systems, which include both plastic and metallic pipes. The gripping ring utilizes all alike teeth.

Also in respect to the use of plastic pipe in piping systems, Gerald L. Anderson and Phillip E. Frair, in their U.S. Pat. No. 4,569,542 of 1986, illustrated and described how the components of their bolted together, restrained pipe coupling are designed to provide clearance functions, so when the bolt fasteners are tightened, the gasket sealing pressures are achieved about the respective plastic pipe ends sequentially before an effective grip on the respective plastic pipes is attained by the respective lock ring, i.e. grip ring.

These patents and other patents indicate how plastic pipes need differently designed and assembled, sealed, bolted joints, in contrast to sealed bolted joints such as illustrated in U.S. Pat. No. 4,092,036 of 1978, in which Messrs Sato and Edo, illustrated and described their pipe junction holder, which positioned at spaced radial locations about a pipe threaded-bolt-positioned-pipe-pressing members having a pair of edges formed on their bottom end surfaces which gripped the pipe.

SUMMARY

To restrain metallic pipe and/or plastic pipe in restrained sealed bolted pipe joints of liquid piping systems, a cooperating combination of a metallic gland and a metallic grip ring is used in the positioning, compressing, and sealing of a gasket about a pipe. In respect to restraining smaller diameter pipes, the grip ring in one embodiment has at least two spaced major size pipe gripping circumferential teeth, which serve to adequately grip both a metallic pipe and a plastic pipe of comparable outside diameters. In respect to smaller diameter pipes and also in respect to larger diameter pipes, the grip ring in another embodiment has major size pipe gripping circumferential teeth and minor size pipe gripping circumferential teeth positioned between and beyond the major size pipe gripping circumferential teeth. The major sized teeth extend radially inwardly farther than the minor sized teeth within the grip ring.

These arrangements of well spaced major teeth by themselves, in an embodiment useful in sealing smaller diameter pipes, and of well spaced major teeth with minor teeth, positioned between and beyond the well spaced major teeth, in an embodiment useful in sealing both smaller diameter pipes and also larger diameter pipes in reference to respective metallic pipe and plastic pipe of comparable outside diameters, are always designed in recognition of the differences in the strengths of the metallic pipes and plastic pipes. A limited amount of engaging force is available, via the tightening of the bolt and nut fasteners.

In respect to metallic pipe, if too many teeth are used in forming a gripping ring, then the engaging forces are so spread out that penetration of the metallic pipe structure does not occur sufficiently or at all. If the teeth do not penetrate sufficiently, the only restraining force is a frictional force, which is not adequate.

In respect to plastic pipe, plastic is a relatively weak material. Therefore during sealing around plastic pipes and restraining plastic pipes, lots of tooth contact area is needed to spread out the restraining forces. If the restraining forces are not spread out sufficiently and are too concentrated, then the plastic pipe material becomes overstressed, causing either unwanted creep or catastrophic failure. Therefore, preferably, and especially when pipe sizes get larger, both well spaced major teeth and minor teeth, positioned between and beyond them, are utilized in making and using a metallic grip ring. A few major teeth allow penetration of metallic pipe, and the minor teeth provide the surface area required for keeping stress levels down in plastic pipe. When a metallic pipe is being restrained by the penetration of the major teeth, the minor teeth do not get in the way of the metallic pipe.

Preferably both the gland and the grip ring are made of ductile iron and when they are in a restrained, sealed, bolted joint with one ductile pipe or two ductile pipes, galvanic corrosion is avoided, which would otherwise occur in the presence of dissimilar metals.

The grip ring is heat treated to increase its strength so the spaced major size pipe gripping circumferential teeth will sufficiently penetrate the pipe wall of a metallic pipe. Also the ductile iron grip ring, after being heat treated has an increased capacity for spring, initially keeping the grip ring at a larger inside diameter during its positioning along a pipe end and later serving in evenly distributing the restraining forces. Moreover, during the heat treating of the ductile iron grip ring the machining burrs or other burrs or spurs, are eliminated, thereby avoiding any possible burr or spur-digging-in-contact with a plastic pipe, which might otherwise occur, before a gasket is sufficiently compressed to create an effective seal about a plastic pipe.

The metallic grip ring, which preferably is a heat treated ductile iron grip ring, has a radial open through slot, creating a starting gap, which accommodates the subsequent reduction of its internal diameter, while still providing a limited sized slot, after most installations. When this grip ring is moved to grip a plastic pipe, after the gasket has been compressed into its sealing position, the at least two spaced major size pipe gripping circumferential teeth penetrate into the plastic pipe sufficiently, so the minor size pipe gripping circumferential teeth also sufficiently penetrate into the plastic pipe.

During this gripping of the plastic pipe, the design of the slot, if it closes, insures the sealing has been completed, and the adequate gripping of the plastic pipe has occurred, without over-stressing the plastic pipe.

When larger diameter pipes are being installed in a piping system, then more major sized pipe gripping circumferential teeth, along with more minor sized pipe gripping circumferential teeth are formed, when making the metallic grip ring, which is preferably a heat treated ductile iron grip ring. This is necessary, because the liquid pressure force to be restrained goes up proportionally with the diameter squared of the pipe, yet the pipe exterior surface, that is available for providing a cooperating restraining area, goes up proportionally only with the diameter of the pipe.

This cooperating combination of a metallic gland, preferably a ductile iron gland, and a metallic grip ring, preferably a heat treated ductile iron grip ring, serving to restrain a metallic pipe or plastic pipe in reference to their respective comparable outside diameters, uniformly distributes the clamping forces around a pipe periphery to provide restraining forces proportional to and/or greater than any possible disengagement forces. In so doing the sealing capability of the gasket is not compromised. This combination in various size embodiments and used with respective sealed bolted joints of different types and sizes is used in respect to a broad variety of metallic and non-metallic pipe materials, in turn installed in a fluid piping system.

In all the embodiments, after the preliminary placement of all the components of a sealed bolted joint, when the bolt fasteners are tightened, the grip ring slides along the pipe with the gland until the grip ring meets the gasket. At this point, the grip ring of a frusto conical shape, with either just respective major size teeth, or with the respective major size and minor size pipe gripping circumferential teeth, begins to compress during the continued advance of the gland, until some or all the teeth penetrate the pipe's surface. Just the major size teeth penetrate, in part, a metallic pipe. All teeth penetrate a plastic pipe.

The grip ring is sized in its preliminary diameter and has a preliminary gap size, or radial open through slot size, which insures that the grip ring actively is involved in seating the gasket for its adequate sealing about the pipe, before the grip ring compresses enough to engage the pipe periphery, to thereafter be ready to restrain the pipe from leaving the bolted, sealed joint.

Whenever any forces may later be imposed upon a pipe or a fitting, in a fluid piping system, tending to cause disengagement, the gland will try to move toward the junction of the pipe and the fitting. This movement causes the inclined surface structure of the gland, which is in contact with the inclined surface structure of the grip ring to be effective in further compressing the grip ring, thereby causing a tighter grip on the pipe. Equilibrium occurs, when the pressure on the pipe causes sufficient longitudinal forces on the gland to counteract, i.e. to restrain, the disengagement force. Action of the gripping grip ring teeth on the pipe surface prevents the grip ring from sliding longitudinally along the pipe, and thereby prevents any disengagement of the sealed bolted joint, by the unwanted relative movement of either a metallic pipe or a plastic pipe.

DRAWINGS

The utilization of the cooperating combination of the gland and the grip ring for installations in respective types of bolted joints, in fluid piping systems, which are primarily in water and sewer piping systems, is illustrated in the drawings, wherein: FIG. 1 is an isometric view, with some portions removed, illustrating a fluid piping system in reference to some locations where this cooperating combination of a metallic gland and a metallic grip ring is installed, such as at a T section, and by a connecting sleeve;

FIG. 2 is an exploded isometric view, with some portions removed, illustrating the sealed end of a pipe using a gasket, an end cap, and the cooperating combination of the gland and the grip ring, with an embodiment of the grip ring being shown that has at least two spaced major size pipe gripping circumferential teeth, and several spaced minor size pipe gripping circumferential teeth located between and beyond the major sized teeth;

FIG. 3 is a partial sectional view, illustrating in one embodiment of the grip ring how the two spaced major size pipe gripping circumferential teeth have partially penetrated into a metallic pipe, while the several spaced minor size pipe gripping circumferential teeth, located between and beyond the major sized teeth, remain clear of the metallic pipe;

FIG. 4 is a partial sectional view, illustrating in one embodiment of the gripping ring how the two spaced major size pipe gripping circumferential teeth have fully penetrated into a plastic pipe and also how all the several spaced minor size pipe gripping circumferential teeth have also fully penetrated into a plastic pipe;

FIG. 5 is a partial sectional view, similar to FIG. 4, showing, however, how the grip ring has an additional major size pipe gripping circumferential tooth, and also has additional spaced minor size pipe gripping circumferential teeth, and all these teeth are embedded in the wall of a larger plastic pipe.

FIG. 6 is a partial sectional view, showing how the grip ring in other embodiments, just has major size pipe gripping circumferential teeth, if all pipes to be gripped are to be metallic pipe, or if smaller diameter plastic pipes are to be gripped;

FIG. 7 is a partial sectional view of the end of a fluid piping system, where a cap is installed on the end of a metallic pipe, utilizing the cooperating combination of this gland and this grip ring, a gasket and mechanical fasteners such as a bolt and nut fastener;

FIG. 8 is an enlarged partial dead sectional view, taken from the designated encircled area of FIG. 7, to illustrate how the grip ring is positioned so the major size pipe gripping circumferential teeth partially penetrate a metallic pipe, after the gasket is in the sealing position thereof, and the several spaced minor size pipe gripping circumferential teeth remain clear of the metallic pipe;

FIG. 9 is a partial sectional view of the end of a fluid piping system, where a cap is installed on the end of a plastic pipe, utilizing the cooperating combination of this gland and this grip ring, a gasket, and mechanical fasteners such as a bolt and nut fastener;

FIG. 10 is an enlarged partial dead sectional view, taken from a designated encircled area of FIG. 9, to illustrate how the grip ring is positioned, after the gasket is in the sealing position thereof, so both the major size pipe gripping circumferential teeth and the minor size pipe gripping circumferential teeth have penetrated into the plastic pipe;

Figure 11:
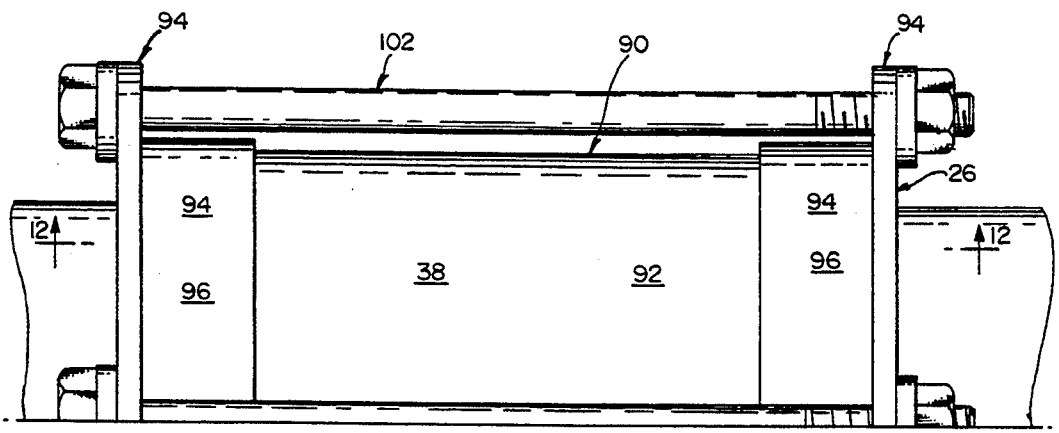
Figure 12:
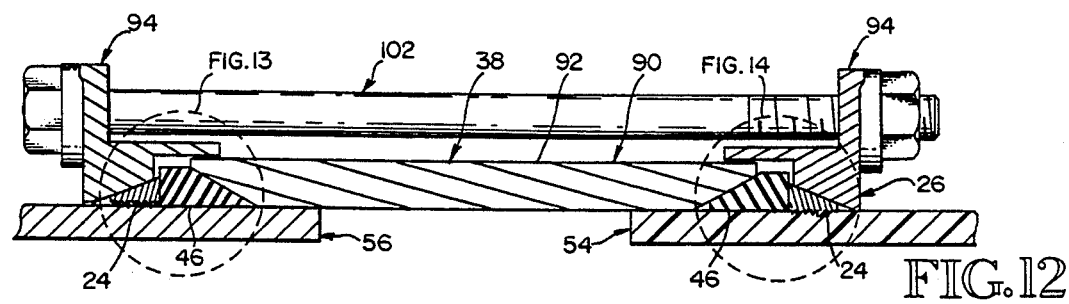
Figure 13:
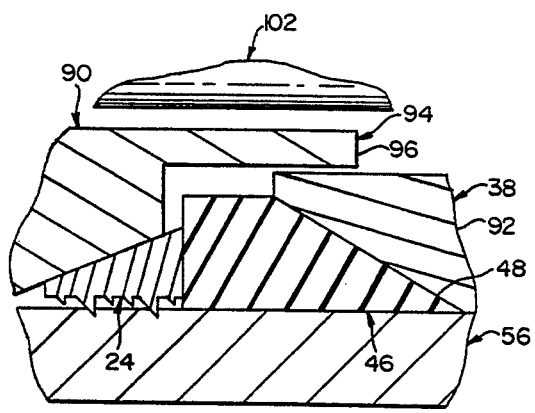
Figure 14:
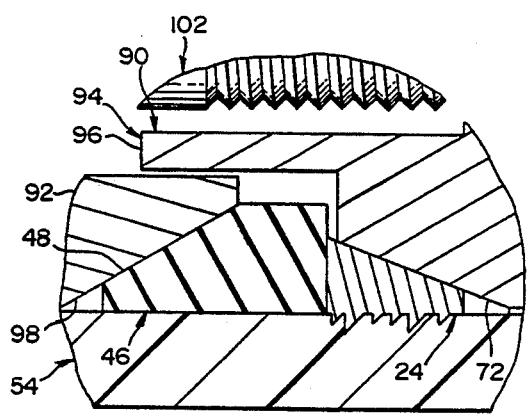

FIG. 11 is a partial exterior view of the connection of two pipes, one a metallic pipe and the other a plastic pipe, at their respective plain ends, which are encircled by a connecting sleeve, and at each sleeve end is a respective cooperating combination of this gland and this grip ring, and a gasket, and mechanical fasteners, which extend between the respective cooperating combinations of this gland and this grip ring;

FIG. 12 is a partial cross sectional view of the connection of the two pipes, one a metallic pipe and the other a plastic pipe, as shown in FIG. 11, illustrating how the glands of these cooperating combinations of the gland and grip ring have an extended rim portion for passing, in part, over the end of the connecting sleeve, with some clearance, and showing how the connecting sleeve at each end has an interior inclined structure to receive the exterior inclined structure of the gasket, and showing how only the major size pipe gripping circumferential teeth penetrate, in part, the metallic, and showing how both the major size pipe gripping circumferential teeth and the minor size pipe gripping circumferential teeth, all penetrate the plastic pipe;

FIG. 13 is an enlarged partial dead sectional view, taken from the designated encircled area of FIG. 12, to illustrate how the grip ring is positioned so the major size pipe gripping circumferential teeth partially penetrate a metallic pipe, after the gasket is in the sealing position thereof, and the several spaced minor size pipe gripping circumferential teeth remain clear of the metallic pipe; and FIG. 14 is an enlarged partial sectional view, taken from another designated encircled area of FIG. 12, to illustrate how the grip ring is positioned so both the major size pipe gripping circumferential teeth and the minor size pipe gripping circumferential teeth, all penetrate the plastic pipe, after the gasket is in the sealing position thereof.

DESCRIPTION OF THE PREFERRED EMBODIMENTS

Introduction Regarding Changes Needed in Products Used to Make Sealed Fluid Tight Joints in Fluid Piping Systems Utilizing Plastic Pipes and Combinations of Plastic and Metallic Pipes Upon the utilization of plastic pipes in fluid piping systems, many of the products being used previously with metallic pipe could not be successfully used with plastic pipes. Plastic materials used in plastic pipes are comparatively and relatively weak materials in contrast to the strength of metallic pipes. When gripping plastic pipes to restrain them within a sealed fluid tight joint in a fluid piping system, lots of gripping tooth contact area is needed to spread out the restraining forces to avoid overstressing a plastic pipe, the creeping of the plastic pipe, or the catastrophic failure of the plastic pipe.

Therefore, as set forth in the Background, and disclosed in U.S. Pat. No. 4,878,698, gripping teeth formed on a split ring are being provided to cooperate with a gland, a seal, and other components of a particular pipe joint to provide this increased need for gripping tooth contact area.

The source of the engaging forces in a particular pipe joint, which are originally active in longitudinal directions, originates upon the tightening of the longitudinally arranged bolt and nut, or the like, fasteners. The radial components of these engaging forces are created by the forceful axial movement of like inclined surface structures on both the split ring, also called a grip ring, and the gland, also called a follower. These inclined surfaces, when appearing in cross section, are conical surfaces, when appearing in three dimensions. These engaging forces are adequate in creating gripping forces on plastic pipe, if sufficient tooth contact area is available to spread out the restraining forces. However, these engaging forces must be concentrated to create gripping forces on metallic pipe and therefore the gripping tooth contact area must be reduced.

Therefore when a product is to be used to create gripping forces on both metallic and plastic pipes, both the concentration of gripping forces, via a grip ring, in respect to metallic pipe, and the spreading out of the gripping forces via a grip ring, in respect to plastic pipe, must be thoroughly considered. With respect to smaller pipe sizes, if the circumferential gripping teeth of a grip ring are major size and well spaced, being preferably two in number, metallic pipes are sufficiently penetrated by these major spaced teeth, and plastic pipes are thoroughly penetrated, without overstressing, by these major spaced teeth. However, when larger pipe sizes are included in a fluid piping system, more gripping tooth area is needed to restrain plastic pipes. Therefore, to provide grip rings that may be used both on larger metallic and plastic pipes, both well spaced major size teeth and minor size teeth located between and beyond the major size teeth are formed on the same grip ring. The major sized teeth extend radially inwardly farther than the minor sized teeth within the grip ring. These respective embodiments and other embodiments of these grip rings are illustrated in the drawings of the cooperating combinations of glands and grip rings as they are used with respective gaskets in respective restrained sealed bolted joints of fluid piping systems.

Portions of a Fluid Piping System

The preferred embodiments of the cooperating combination 20 of a gland 22 and a grip ring 24 in some restrained sealed bolted joints 26 of a fluid piping system 28, often a water piping system or a sewer piping system, are illustrated in the drawings. In FIG. 1 a fluid piping system 28 is illustrated, by way of example, which has a pipe tee section 30 associated with joining a pipe 32 arranged at a right angle with a pipe 34, and respective restrained sealed bolted joints 26 are utilized. Because a third pipe is not as yet needed, an end cap 36 is part of another restrained sealed bolted joint 26. Also shown in FIG. 1, is the installed sleeve coupling, also referred to as a flex coupling, having a sleeve 38 joining the pipes 40 and 42 using restrained sealed bolted joints 26.

An Exploded View of a Restrained Sealed Bolted Joint Having an End Cap

The end cap 36 with its restrained sealed bolted joint 26, which includes a preferred embodiment of the cooperating combination 20 of a gland 22 and a grip ring 24, is further illustrated in the exploded view of FIG. 2. A gasket 46 is shown adjacent the end cap 36 into which it is placed into a gasket receiving volume thereof, with its exterior inclined structure 48 fitting the interior inclined structure 50 of the end cap 36. The interior surface structure 52 of the gasket 46 later contacts and presses against the exterior of a plastic pipe 54, a metallic pipe 56, or another type of pipe. The gasket 46 has a radially positioned contacting surface structure to be contacted by the radially positioned contact surface structure 60 of the grip ring 24, also referred to as a shoulder structure 60.

There is an exterior inclined structure 62 on the grip ring 24. The interior structure 64 of the grip ring 24 in this illustrated embodiment has at least two spaced major size pipe gripping circumferential teeth 66 and several spaced minor size pipe gripping circumferential teeth 68 located between and beyond the major sized teeth 66. The grip ring has a strong internal central body portion 70.

The gland 22 has an interior inclined structure 72 which initially receives only part of the exterior inclined structure 62 on the grip ring 24. The gland 22 has a strong integral combined body portion 74 and a flange portion 76. At spaced locations the receiving hole structures 78 are integrally formed with the flange portion 76, to subsequently receive connecting bolt and nut fasteners 82, serving as the mechanical fasteners.

As noted in FIG. 2, the grip ring 24, has an exterior inclined structure 62, which commences at a larger diameter thereof, which is located at the radial contacting surface structure 60 thereof, which initially faces and later contacts the gasket 46 at its radial contacting surface 58 thereof. Then this external inclined structure 62 terminates at a smaller diameter, which is located at a radial surface structure 86 thereof, which initially faces the interior inclined structure 72 of the gland 22 of this cooperating combination 20 of this gland 22 and the grip ring 24.

Also as noted in FIG. 2, the gland 22, has an interior inclined structure 72 thereof, which commences at a larger diameter thereof which is located at the radial surface structure 80 which initially faces the grip ring 24, and also initially faces in the direction of the gasket 46. Then this interior inclined structure 72 terminates at a smaller diameter thereof, which is located at the radial surface structure 81, which initially faces and is later nearer the smaller diameter of the exterior inclined structure 62 of the grip ring 24, when portions of this interior inclined structure 72 are later in forceful contact with portions of the exterior inclined structure 62 of the grip ring 24, after installation of this cooperating combination 20 of the gland 22 and the grip ring 24 in a restrained sealed bolted joint 26 of a fluid piping system 28.

In One Embodiment The Grip Ring Has Spaced Major Size Pipe Gripping Circumferential Teeth and Spaced Minor Sized Gripping Circumferential Teeth The metallic grip ring 24, which is preferably made of heat treated ductile iron, has spaced major size pipe gripping circumferential teeth 66 arranged, for example, as particularly shown in FIGS. 3, 4, and 5. When a metallic pipe which is often a ductile iron pipe 56 is to be gripped, as shown in FIG. 3, only the spaced major size pipe gripping circumferential teeth 66 penetrate, in part, the metallic pipe 56. However, when a plastic pipe 54 is to be gripped, as shown in FIG. 4, both the major size and minor size pipe gripping circumferential teeth 66 and 68 penetrate into the plastic pipe 54. Then when a larger diameter plastic pipe 54 is to be gripped, as shown in FIG. 5, the larger diameter grip ring 24 is made to have more major size and minor size pipe gripping circumferential teeth 66 and 68, which all penetrate into the plastic pipe 54, without overstressing the plastic pipe 54. The major sized teeth extend radially inwardly farther than the minor sized teeth within the grip ring.

In Another Embodiment The Grip Ring Only Has Spaced Major Size Pipe Gripping Circumferential Teeth, When Metallic Pipe Or Plastic Pipe of a Sufficiently Small Diameter is to be Used in a Fluid Piping System As shown in FIG. 6, if it is known that all piping to be installed in a piping system 28 is to be metallic pipe, or plastic pipe of sufficiently small diameter, then grip rings 88 having only spaced major size pipe gripping circumferential teeth 66, may be used.

The Assembled Restrained Sealed Bolted Joint Inclusive of a Metallic Pipe and a Metal End Cap In FIGS. 7 and 8, the assembled restrained sealed bolted joint 26 is shown, where a metallic pipe 56 is fitted into a metal end cap 36. The gasket 46 has been firmly fitted into the interior inclined structure 50 of the end cap 36 and compressed into sealing contact with the metallic pipe 56. This occurs upon the cooperating directive action between the exterior inclined structure 48 of the gasket 46 and this interior inclined structure 50 of the end cap 36, when being compressed upon the axially directed movement of the grip ring 24, when the bolt and nut fasteners 82 are being tightened to draw together the gland 22 and the end cap 36. During this tightening after the sealing has occurred, the major teeth of the grip ring are positioned to restrain the metallic pipe, keeping the metallic pipe end in the restrained sealed bolted joint 26 of the fluid piping system 28.

The Assembled Restrained Sealed Bolted Joint Inclusive of a Plastic Pipe and a Metal End Cap In FIGS. 9 and 10, the assembled restrained sealed bolted joint 26 is shown, where a plastic pipe 54 is fitted into a metal end cap 36. The gasket 46 has been firmly fitted into the interior inclined structure 50 of the end cap 36 and compressed into sealing contact with the plastic pipe 54. This occurs upon the cooperating directive action between the exterior inclined structure 48 of the gasket 46 and this interior inclined structure 50 of the end cap 36, when being compressed upon the axially directed movement of the grip ring 24, when the bolt and nut fasteners 82 are being tightened to draw together the gland 22 and the end cap 36. During this tightening after the sealing has occurred, the major and minor teeth of this grip ring are positioned to restrain the plastic pipe, keeping the plastic pipe end in the restrained sealed bolted joint 26 of the fluid piping system 28.

An Assembled Restrained Sealed Bolted Joint Inclusive of a Connecting Sleeve Used in Joining a Metallic Pipe to a Plastic Pipe, and Called a Sleeve Coupling or a Flex Coupling As illustrated in FIGS. 11, 12, 13, and 14, an assembled restrained sealed bolted joint 26 called a sleeve coupling or a flex coupling 90 includes a connecting sleeve 92 which is used to join a metallic pipe 56 to a plastic pipe 54. Two cooperating combinations 20 are used, both having a grip ring 24 of a configuration previously illustrated and described. However the glands 94 are each formed, as shown in FIG. 12 to have an extended rim portion 96, which upon assembly in this restrained sealed bolted joint 26, passes, in part, over the end of the connecting sleeve 92 with some clearance between them to complete the protective surrounding of the gasket 46. The connecting sleeve 92 at each end thereof has an interior inclined structure 98 to guide and to receive the exterior inclined structure 48 of the gasket 46. When the through connecting bolt and nut fasteners 102 are tightened, these inclined shoulders 98 and 48 effectively direct the gasket into sealing contact with either the metallic pipe 56 or the plastic pipe 54, as the respective grip rings 24 move and press against the gasket 46, of the restrained sealed bolted joint 26.

As shown in FIG. 13, after the tightening of the through connecting bolt and nut fasteners 102, causing the gaskets 46 to create their seals, the grip ring 24 is positioned, so the spaced major size pipe gripping circumferential teeth 66 partially penetrate a metallic pipe 56, and the several spaced minor size pipe gripping circumferential teeth 68 remain clear of the metallic pipe 56.

Then as shown in FIG. 14, after tightening of the through connecting bolt and nut fasteners 102, causing the gaskets 46 to create their seals, the grip ring 24 is positioned, so both the major size pipe gripping circumferential teeth 66 and the minor size pipe gripping circumferential teeth 68 all penetrate the plastic pipe 54, after the gasket 46 is in the sealing position thereof, about the plastic pipe 54.

Regarding Other Restrained Sealed Bolted Joints

An illustrated connection of a plain end of a pipe to the bell end of another pipe would essentially be like the illustration of the connecting of the end cap to the plain end of a pipe. Essentially all of any restrained sealed bolted joints could include the cooperating combination 20 of a gland 22 or gland 94 and a grip ring 24, preferably having both the well spaced major size and minor size pipe gripping circumferential teeth located between and beyond the major size teeth.

Regarding the Size of the Slot, i.e. the Gap, in the Grip Ring and the Central Body of the Grid Ring The slot, i.e. gap, in the grip ring is carefully sized so the grip ring will fully engage into a soft pipe, i.e. a plastic pipe, but the grip ring is not allowed to compress so far, in respect to its size, so the outside diameter of the grip ring gets to be smaller than the inside diameter of the gland, i.e. the follower, causing the grip ring 24 pull through the gland.

Also the slot, i.e. gap, in the grip ring is carefully sized so when the slot is closed the plastic pipe is well penetrated by all the major size and minor size pipe gripping circumferential teeth, yet the plastic pipe is not over-stressed.

Also the central body 70 of the grip ring 24 has a large enough cross section, which is strong enough to keep the grip ring 24 from buckling or twisting and thereby preventing any pull through movement of the grip ring 24.

Regarding the Heat Treating of the Grip Ring

The metallic grip ring is preferably a ductile iron grip ring 24 which is heat treated, to accomplish three things. First, this allows the ductile iron grip ring, which is often made of the same ductile iron material used in making the pipe, to sufficiently penetrate the metallic pipe wall. This is also important because most of the installations are placed underground and when corrosion is possible based on dissimilar metals causing galvanic corrosion, this type of corrosion is avoided by using the similar material, i.e. ductile iron, for the pipe 56, the gland 22 and the grip ring 24.

Second, the heat treating of the grip ring increases the springiness of the grip ring. This is important when the grip ring is going through its initial compression and is then causing the sealing of the gasket prior to the time when the grip ring is gripping the pipe. This extra springiness helps keep the grip ring from engaging the pipe too soon.

Third, the heat treating deburrs the tooth edges. In order to get teeth that are sharp enough to penetrate hard pipe, they must be machined into the grip ring, as opposed to having cast in teeth which would be dull. This machining of the teeth on the ductile iron grip rings leaves little spurs on the tooth tips. These little spurs cause a problem when the grip ring is used on soft pipe, i.e. plastic pipe. The spurs tend to dig into the plastic, causing the grip ring to engage the plastic pipe before the gasket has been compressed enough, to create the seal about the plastic pipe. This failure to complete a good seal causes leakage through the intended restrained sealed bolted joint.

The Cooperating Combination of the Respective Glands and the Respective Grip Rings Are Used in a Wide Variety of Pipe Fittings of Restrained Sealed Bolted Joints and They are Used With a Broad Variety of Metallic and Non Metallic Pipe Materials The respective cooperating combinations of the respective glands and the respective grip rings, with their combined major size and minor size spaced pipe gripping circumferential teeth, when installed in restrained sealed pipe joints uniformly distribute the clamping forces around the respective pipes and provide restraining forces proportional to disengagement forces, while not, at any time, compromising the seal created by the compressed gasket, while providing this restraint. In so doing, the utilization of these cooperating combinations of glands and grip rings is applicable to a broad variety of metallic and non-metallic pipe materials. Moreover, these cooperating combinations of glands and grip rings are used with a wide variety of pipe fittings, because they are not necessarily designed for being included in a particular embodiment of a restrained sealed bolted joint. Moreover, these cooperating combinations of glands and grip rings are used with currently available mechanical joint gaskets. In the most common installations the standard American Water Works Association mechanical joint gasket is used, which is designated ANSI/AWWA Standard C-111/A21.11-90.

We claim:

1. For fluid piping systems, which are primarily water and sewer piping systems, a cooperating combination of a gland and a grip ring for installations in respective types of bolted joints, which include a gasket, comprising:
   a. the grip ring having the integral arrangement of:
      i. a radial open through slot to accommodate the subsequent reduction of the internal diameter thereof, while still providing a limited size slot;
      ii. a commencing internal diameter exceeding the diameter of a pipe to be subsequently engaged by the grip ring, when the diameter thereof is later reduced;
      iii. an internal surface structure having at least two spaced major size pipe gripping circumferential teeth and several spaced minor size pipe gripping circumferential teeth located between and beyond the major sized teeth and the major teeth extending radially inwardly farther than the minor teeth within the grip ring;

iv. an external inclined structure, commencing at a larger diameter end thereof, at a larger vertical shoulder thereof, which will initially face and later contact a gasket of a bolted joint, and terminating at a smaller diameter end at a smaller vertical shoulder thereof which will initially face the gland of this cooperating combination; and b. the gland having the integral arrangement of:

i. an internal surface structure, commencing at a larger diameter end thereof, at a vertical shoulder thereof, which initially faces the grip ring, and which initially faces in the direction of the gasket of the bolted joint, and terminating at a smaller diameter end thereof which initially faces and is nearer the smaller diameter end of the external inclined surface structure of the grip ring, when portions of this internal inclined surface structure are in forceful contact with portions of the external inclined structure of the grip ring, after installation, in a bolted joint, when the bolt and nut fasteners of the bolted joint are tightened; and ii. variable external surface structures including: a central body portion adjacent the internal inclined surface structure thereof; a flange extending out from the central body portion thereof; and spaced receiving hole structures extending out from the flange thereof to receive bolts of the bolted joint, which also will be received in spaced receiving hole structures of another piping structure, and thereafter, respective nuts are threaded on the installation bolts, and when these nuts are fully tightened, a respective type of the bolted joint will be completed, insuring both the sealing contact of the gasket around the pipe as the grip ring presses the gasket into the sealing position, providing adequate gripping contact of the grip ring about the pipe, whether it be a metal or plastic pipe.

2. For fluid piping systems, which are primarily water and sewer piping systems, a cooperating combination of a gland and a grip ring for installations in respective types of bolted joints, which include a gasket, as claimed in claim 1, wherein the internal surface structure of the grip ring which has at least two spaced major size pipe gripping circumferential teeth, and also which has, in addition, minor size pipe gripping circumferential teeth spaced between and beyond the two major size pipe gripping circumferential teeth, is so proportioned, whereby at a subsequent installation time in a bolted joint:

a. when a seal is created about a metallic pipe the at least two spaced major size pipe gripping circumferential teeth penetrate, in part, into the metallic pipe, to keep the metallic pipe restrained and installed in the bolted joint of the fluid piping system, and the minor size teeth remain clear of the metallic pipe; and b. when a seal is created about a plastic pipe, of a comparable outside diameter to the metallic pipe, the at least two spaced major size pipe gripping circumferential teeth penetrate into the plastic pipe sufficiently, so the minor size pipe gripping circumferential teeth also sufficiently penetrate into the plastic pipe, without over-stressing the plastic pipe, thereby increasing the potential of any subsequent restraining force opposing the removal of the plastic pipe from the bolted joint of the fluid piping system.

3. For fluid piping systems, which are primarily water and sewer piping systems, a cooperating combination of a gland and a grip ring for installations in respective bolted joints, which include a gasket, as claimed in claim 2, wherein the internal diameter surface structure of the grip ring has three major size pipe gripping circumferential teeth, and also has more minor size pipe gripping circumferential teeth spaced between and beyond the major size pipe gripping circumferential teeth, whereby an increase of the number of the major size and minor size spaced pipe gripping circumferential teeth, accompanies an increase in diameters of the combination of the gland and the grip ring in respective types of bolted joints, which include larger diameter gaskets, to create seals about larger diameter pipes, to thereby increase any subsequent restraining force opposing removal of the pipe from the bolted joint of the fluid piping system, because the liquid pressure force to be restrained goes up, proportionally with the diameter squared of a pipe, yet a pipe exterior surface, that is available for providing a cooperating restraining area, goes up proportionally only with the diameter of the pipe.

4. For fluid piping systems, which are primarily water and sewer piping systems, a cooperating combination of a gland and a grip ring for installations in respective bolted joints, which include a gasket, as claimed in claim 2, wherein the grip ring in respect to the radial open through slot therein is presized, so when a liquid seal is completed about the plastic pipe, the major and minor teeth thereof are embedded in the plastic pipe, and if excessive closing forces have been applied, the slot would be closed, and the outside larger diameter of the grip ring remains larger than the smaller inside diameter of the gland, thereby always insuring that the plastic pipe is not crushed and that the grip ring is not pushed through the gland.

5. For fluid piping systems, which are primarily water and sewer piping systems, a cooperating combination of a gland and a grip ring for installations in respective bolted joints, which include a gasket, as claimed in claims 1, 2, 3, or 4, in combination with the gasket, the pipe having a plain end, a fitting for engagement with the gland having a gasket receiving volume, and mechanical fasteners extending through the holes, thereby comprising a bolted joint.

6. For fluid piping systems, which are primarily water and sewer piping systems, a cooperating combination of a gland and a grip ring for installations in respective bolted joints, which include a gasket, as claimed in claims 1, 2, 3, or 4, in combination with a gasket, the pipe having a plain end, an end cap having a bell end at one end of the pipe, having a gasket receiving volume, and mechanical fasteners extending through the hole, thereby comprising a bolted joint.

7. For fluids piping systems, which are primarily water and sewer piping systems, a cooperating combination of a gland and a grip ring for installations in respective bolted joints, which include a gasket, as claimed in claims 1, 2, 3, or 4, in combination with two pipes having plain ends, a coupling sleeve bridging the two pipes, having two gasket receiving volumes at axial ends thereof, two gaskets disposed in the volumes, and another additional cooperating combination of a gland and a grip ring, and mechanical fasteners through holes in both glands, thereby comprising a bolted joint.

8. For fluid piping systems, which are primarily water and sewer piping systems, a cooperating combination of a gland and a grip ring for installations in respective types of bolted joints, which include the continuing cooperation of at least one member having a gasket receiving volume, and a pipe end receiving volume, and holes to receive bolts, a gasket, and bolt and nut fasteners to draw together and secure the gland to the member that receives the gasket and the pipe end, comprising:
 a) the member having a gasket receiving volume and the pipe end receiving volume and holes receiving bolts;
 b) the gasket fitted into the gasket receiving volume;
 c) bolt and nut fasteners, with the bolts passed through the holes both in the member and in the gland;
 d) the pipe end fitted in the pipe end receiving volume;
 e) the grip ring having the integral arrangement of:
  i. a radial open through slot to accommodate the reduction of the internal diameter thereof, while providing a limited size reduction of the grip ring;
  ii. a commencing internal diameter exceeding the diameter of the pipe engaged by the grip ring, when the diameter thereof has been reduced;
  iii. an internal surface structure having at least two spaced major size pipe gripping circumferential teeth and several spaced minor size pipe gripping circumferential teeth located between and beyond the major sized teeth and the major teeth extend radially inwardly farther than the minor teeth within the grip ring;
  iv. an external inclined structure, commencing at a larger diameter end thereof, at a larger vertical shoulder thereof, which faces and contacts the gasket, and terminating at a smaller diameter end thereof at a smaller vertical shoulder thereof which faces the gland of the cooperating combination; and
 f. the gland having the integral arrangement of:
  i. an internal surface structure, commencing at a larger diameter end thereof, at a vertical shoulder thereof, which faces the grip ring, and which faces in the direction of the gasket, and terminating at a smaller diameter end thereof which faces and is nearer the smaller diameter end of the external inclined structure of the grip ring, when portions of the internal inclined surface structure are in forceful contact with portions of the external inclined structure of the grip ring, upon installation, when the engaging forces have been created when the bolt and nut fasteners have been tightened; and
  ii. variable external surface structures including a central body portion adjacent the internal inclined surface structure thereof; a flange extending out from the central body portion thereof; and spaced receiving hole structures extending out from the flange thereof which receive installation bolts, which are also received in spaced receiving hole structures of the member, which receives the gasket and the pipe end, and respective nuts are threaded and tightened on the respective installation bolts, and the respective type of the bolted joint is completed, insuring both the sealing contact of the gasket around the pipe, and that the grip ring has pressed the gasket into sealing position, providing adequate gripping contact of the grip ring about the pipe.

9. A bolted joint for fluid piping systems, which are primarily water and sewer piping systems, comprising:
 a) at least one member having at least one gasket receiving volume portion which directs an incoming gasket into contact with a pipe, and at least one pipe end receiving volume portion, and spaced holes receiving installation bolts;
 b) a gasket fitted into the gasket receiving volume portion of the member and directed into contact with the pipe;
 c) installation bolt and nut fasteners, with the installation bolts passed through the holes both of the member and a gland;
 d) the pipe having an end thereof fitted into the pipe end receiving volume portion of the member;
 e) a grip ring surrounding the pipe near the end thereof having the integral arrangement of:
  i. a radial open through slot to accommodate the reduction of the internal diameter thereof, while providing a limited size reduction of the grip ring;
  ii. a commencing internal diameter exceeding the diameter of a pipe, which is fully engaged by the grip ring, when the diameter of the grip ring has been reduced when this bolted joint has been tightened;
  iii. an internal structure having at least two spaced major size pipe gripping circumferential teeth and several spaced minor size pipe gripping circumferential teeth located between and beyond the major sized teeth, and the major teeth extend radially inwardly farther than the minor teeth within the grip ring;
  iv. an external inclined structure, commencing at a larger diameter end thereof, at a larger vertical shoulder thereof, which faces and contacts the gasket, and terminating at a smaller diameter end thereof at a smaller vertical shoulder thereof which faces and contacts the gland of the bolted joint; and
 f. the gland having the integral arrangement of:
  i. an internal surface structure, commencing at a larger diameter end thereof, at a vertical shoulder thereof, which faces and contacts the grip ring, and which faces in the direction of the gasket, and terminating at a smaller diameter end thereof which faces and is nearer the smaller diameter end of the external inclined structure of the grip ring, when portions of this internal inclined surface structure are in forceful contact with portions of the external inclined structure of the grip ring, upon installation, when the engaging forces have been created when the installation bolt and nut fasteners have been tightened; and
  ii. variable external surface structures including a central body portion adjacent the internal inclined surface structure thereof; a flange extending out from the central body portion thereof; and the spaced receiving hole structures extending out from the flange thereof which received the installation bolts, which is also passed through the spaced receiving holes of the member, which receive the gasket and the pipe end, and respective nuts are threaded and tightened on the respective installation bolts, and this bolted joint is completed, insuring both the sealing contact of the gasket around the pipe, and that the grip ring has pressed the gasket into sealing position, providing adequate gripping contact of the grip ring about the pipe.

* * * * *